(12) United States Patent
Hautson et al.

(10) Patent No.: US 11,016,602 B2
(45) Date of Patent: May 25, 2021

(54) METHOD FOR LOCATING AT LEAST ONE MOVABLE MAGNETIC OBJECT AND ASSOCIATED SYSTEM

(71) Applicant: ISKN, Grenoble (FR)

(72) Inventors: Tristan Hautson, Fontaine (FR); Rabeb Aloui, Fontaine (FR)

(73) Assignee: ISKN, Saint Martin d'Heres (FR)

( * ) Notice: Subject to any disclaimer, the term of this patent is extended or adjusted under 35 U.S.C. 154(b) by 628 days.

(21) Appl. No.: 15/534,836

(22) PCT Filed: Dec. 7, 2015

(86) PCT No.: PCT/EP2015/078817
§ 371 (c)(1),
(2) Date: Jun. 9, 2017

(87) PCT Pub. No.: WO2016/091800
PCT Pub. Date: Jun. 16, 2016

(65) Prior Publication Data
US 2017/0350723 A1 Dec. 7, 2017

(30) Foreign Application Priority Data
Dec. 9, 2014 (FR) ...................................... 1462108

(51) Int. Cl.
*G06F 3/041* (2006.01)
*G06F 3/046* (2006.01)
(Continued)

(52) U.S. Cl.
CPC ........... *G06F 3/0418* (2013.01); *G01D 3/022* (2013.01); *G01D 5/12* (2013.01); *G06F 3/046* (2013.01)

(58) Field of Classification Search
CPC .................................................... G01D 3/022
See application file for complete search history.

(56) References Cited

U.S. PATENT DOCUMENTS

| | | | |
|---|---|---|---|
| 2003/0095115 A1 | 5/2003 | Brian et al. | |
| 2012/0078562 A1 | 3/2012 | Yamada et al. | |
| 2015/0084915 A1* | 3/2015 | Hautson | G01B 7/004 345/174 |

FOREIGN PATENT DOCUMENTS

| | | | |
|---|---|---|---|
| FR | 2 988 862 A1 | 10/2013 | |
| FR | 2 988 872 A1 | 10/2013 | |

\* cited by examiner

*Primary Examiner* — John E Breene
*Assistant Examiner* — Jeffrey C Morgan
(74) *Attorney, Agent, or Firm* — BakerHostetler (57) ABSTRACT

A method for locating at least one movable magnetic object relative to a network of at least N tri-axial magnetometers linked together mechanically with no degree of freedom to retain a known relative position of these magnetometers, N being an integer number at least equal to 2, comprises, continuously: a step of detection of a magnetometer capable of being magnetized, i.e. capable of delivering as output measurements comprising a measurement bias following a magnetization; a step of correction, by means of a correction bias, of the measurements delivered by the magnetometer capable of being magnetized, the correction bias corresponding to a deviation between the measurements supplied by the magnetometer as input for a location filtering and the estimations, upon the location filtering, of the data delivered by the magnetometer; and a step of consideration of the magnetometer as not capable of being magnetized, by taking into account the step of correction of the magnetometer capable of being magnetized.

17 Claims, 3 Drawing Sheets

(51) Int. Cl.
*G01D 3/02* (2006.01)
*G01D 5/12* (2006.01)

METHOD FOR LOCATING AT LEAST ONE MOVABLE MAGNETIC OBJECT AND ASSOCIATED SYSTEM

CROSS-REFERENCE TO RELATED APPLICATIONS

This application is a National Stage of International patent application PCT/EP2015/078817, filed on Dec. 7, 2015, which claims priority to foreign French patent application No. FR 1462108, filed on Dec. 9, 2014, the disclosures of which are incorporated by reference in their entirety.

FIELD OF THE INVENTION

The present invention relates to a method for locating at least one movable magnetic object and to an associated system.

BACKGROUND

Documents relating to methods and devices for locating a magnetic object are known, such as the document FR 2 988 862.

The document FR 2 988 862 discloses a method for locating a magnetic object from measurements of a network of tri-axial magnetometers, this network comprising N tri-axial magnetometers linked mechanically to one another with no degree of freedom to retain a known distance between each of these magnetometers, in which N is an integer number greater than five. The network of magnetometers is contained in a device comprising a bearing surface for a writing support such as one or more sheets, linked or not.

The location of a magnetic object can be considered as its position (coordinates (x, y, z) in a fixed reference frame relative to the network of magnetometers) and the value of its magnetic moment ((Mx, My, Mz) in the same reference frame) representative of the orientation of the magnetic object.

The introduction of a bias into this type of method makes the location inaccurate, and even unstable.

In an application for digitizing the handwritten trace of a movable magnetic object, the magnetometers are required to perceive significant magnetic fields when the magnetic object is at a short distance therefrom. Now, the performance levels of most magnetometers degrade when they are subjected to a significant magnetic field, generally of the order of 3 Gauss. Similarly, the ferromagnetic materials, there occurs in particular a remnant magnetic field which corresponds to an additional measurement bias.

The use of such a device in a system for digitizing a handwritten trace for which the accuracy of the location sought is below 1 mm, means that a measurement bias results in a loss of accuracy, even a divergence of the estimation algorithms implemented in the location filtering.

This phenomena of magnetization of the magnetometers is generally disregarded, which means that a sufficient accuracy cannot be obtained. In effect, the measurement biases of the magnetometers, and the magnetization generated by the use of a movable magnetic object, such as a stylet provided with a magnet, degrade the estimation of the positions and orientation of the magnet.

It is known practice to take into account the measurement biases of the magnetometers at the start of use, by storing, on start up, the value of the sensor currents and by subtracting it subsequently before the step of computation of the estimation algorithms. These measurement biases are thus no longer visible and therefore no longer have any effect on the algorithm.

This solution only takes into account the initial measurement biases and does not therefore make it possible to ensure correct operation over a long period. The magnetization phenomena creates additional biases over time which are not taken into account with the initialization.

In effect, for a standard magnet whose moment is close to $0.2\ A.m^2$, the magnetometers can begin to be magnetized, that is to say exhibit an offset, as soon as the magnet is closer than 6 cm to the device. That limits the use of the device over time by creating estimation errors.

SUMMARY OF THE INVENTION

One aim of the invention is to mitigate these problems.

According to one aspect of the invention, a method is proposed for locating at least one movable magnetic object relative to a network of at least N tri-axial magnetometers linked together mechanically with no degree of freedom to retain a known relative position of these magnetometers, N being an integer number at least equal to 2, comprises, continuously:

a step of detection of a magnetometer capable of being magnetized, i.e. capable of delivering as output measurements comprising a measurement bias following a magnetization;

a step of correction, by means of a correction bias, of the measurements delivered by said magnetometer capable of being magnetized, said correction bias corresponding to a deviation between the measurements supplied by said magnetometer as input for location filtering and the estimations, upon said location filtering, of the data delivered by said magnetometer; and a step of consideration of said magnetometer as not capable of being magnetized, by taking into account said step of correction of said magnetometer capable of being magnetized.

The biases considered are bias vectors, i.e. they can be mono-axial, bi-axial or tri-axial. In effect, the magnetization can be on two or three axes, like the correction.

Thus account is taken of the magnetizations of the magnetometers and ferromagnetic components close to the sensors by the movable magnetic object or objects, which are continuously corrected. Furthermore, such a method makes it possible to take into account the magnetizations on starting up the device.

In one implementation, the method comprises an influence limiting step consisting in limiting, in said location filtering, the influence of the measurements supplied by said magnetometer capable of being magnetized.

Thus, the accuracy and the reliability of the location device is enhanced, by limiting the influence of the magnetometer or magnetometers and of the ferromagnetic objects capable of being magnetized.

According to one implementation, the influence limiting step comprises an increasing of a variance associated with the measurements of said magnetometer capable of being magnetized in said location filtering using a Kalman filtering.

Thus, the estimations made during the location filtering the weight or significance given to the magnetometers capable of being magnetized directly or subjected to ferromagnetic component influence.

In a variant, the influence limiting step comprises not taking into account the measurements of said magnetometer capable of being magnetized in said location filtering.

Thus, the magnetometer or magnetometers capable of being magnetized are not taken into account in the location filtering. This not taking into account also offers the advantage of reducing the computation power needed and therefore the consumption of the system which can use the time available to switch to standby for example.

In one implementation, the detection step uses information of saturation of a register of status information directly supplied by said magnetometer capable of being magnetized. This status information can describe the saturation of one or more axes of the magnetometer.

Thus, it is possible to detect the saturation of one or more axes of a magnetometer capable of being magnetized.

According to one implementation, the detection step detects a magnetometer capable of being magnetized when a norm of the values of the measurements supplied by said magnetometer capable of being magnetized are greater than a first threshold.

The first threshold can for example be of the order of half of the full measurement scale, or, in other words, half of the maximum that can be measured by the magnetometer. This threshold can be expressed as least significant bit, or LSB.

Thus, if a magnetometer is magnetized before a saturation, it is possible to detect that the latter is magnetized. Furthermore, a significant magnetic field on the sensor also reflects a significant magnetic field on the nearby components which can also be magnetized and therefore exhibit an offset or bias on the magnetometer.

In one implementation, the detection step detects a magnetometer capable of being magnetized when a norm of the estimations, upon said location filtering, of the data delivered by said magnetometer capable of being magnetized, are greater by a second threshold than the norm of the estimations of said delivered data computed from the estimations, upon said location filtering, of the data delivered by the other magnetometers not detected as capable of being magnetized.

The second threshold can for example have a value two times the full scale of the magnetometer, and be expressed as LSB.

Thus, if a magnetometer capable of being magnetized returns erroneous data in the presence of a significant magnetic field, the estimated values make it possible to detect the magnetization of this sensor.

Furthermore, if there is a desire to use a magnetometer with a lower full scale to limit the quantization noise, this method makes it possible to accurately detect the magnetization even outside of the range of measurements of the sensor. In effect, the estimated measurements are not flipped to the full scale of the sensor.

According to one implementation, the detection step detects a magnetometer capable of being magnetized when a norm of an error on the measurements of a magnetometer is greater by a third threshold than each of the norms of the errors on the measurements of the other magnetometers, an error on the measurements of a magnetometer corresponding to a deviation between the measurements supplied by said magnetometer as input for a location filtering and the estimations, upon said location filtering, of the data delivered by said magnetometer.

In other words, for each magnetometer, the difference between real measurements and estimated measurements or data are computed first of all, then this difference is normalized and compared for each magnetometer capable of being magnetized to that of the other sensors.

Thus, the magnetization of a magnetometer can be detected even when the magnet is not close, when the estimated field is not significant, or when the magnetometer has not been saturated, etc.

As a variant, it is possible to just compare the norm of the difference to a threshold (without linking this norm to the measurement errors of the other sensors).

In one implementation, in which the correction step is performed when said magnetometer capable of being magnetized is not saturated.

That makes it possible to improve the reliability of the correction, because, when the magnetometer is saturated, the measurement returned by the magnetometer is not representative of the real magnetic field (because the sensor is saturated).

According to one implementation, in which the correction step is performed when the measurements delivered by said magnetometer capable of being magnetized are below a fourth threshold.

The fourth threshold can be chosen to be five times the noise of the magnetometer or RMS noise for "root mean square noise", and can be expressed in Tesla.

This condition is generally met when the magnetic source is far from the sensor and does not risk magnetizing the latter again.

In a variant, the correction step is performed when the estimations of the data delivered by said magnetometer capable of being magnetized are below the fourth threshold.

Considering the estimated data has the merit of not having a measurement bias and the comparison to a threshold is more reliable.

In one implementation, the correction step is performed when the distance separating said magnetometer capable of being magnetized and the movable magnetic object or objects is greater than a fifth threshold.

This threshold can be chosen as a multiple of the greatest dimension of the magnetic object, for example three times the greatest dimension of the magnetic object.

Thus, it is possible to correct a magnetized magnetometer even if the estimated magnetic field has not been computed for this sensor. For example, the magnetometer being detected as magnetized, it is possible to no longer compute the estimated magnetic field until this sensor is corrected.

According to one implementation, in which the correction step is performed when the movable magnetic object or objects are in a stable position.

Thus, the estimated measurements are more reliable when the location algorithm of the location filtering has converged to the real position of the movable magnetic object. In effect, upon rapid movements, the measurement error also incorporates the convergence errors of the algorithm.

This threshold can for example be $10^{-6}$ mm$^2$.

In one implementation, in which the correction step is performed when a variance of an estimated position of the movable magnetic object or objects, over a plurality of successive estimations, is below a sixth threshold.

In effect, a low variance describes a small movement of the movable magnetic object and therefore the location algorithm has had time to converge toward the position of the movable magnetic object.

According to one implementation, in which the correction step is performed when a variance of an error on the measurements of the magnetometers not detected as capable of being magnetized, over a plurality of successive estimations, is below a seventh threshold.

This threshold can be chosen to be twenty-five times the square of the noise of the magnetometer or RMS noise, expressed in Tesla$^2$.

Thus, the measurement error describes also the state of convergence of the location filtering. A low measurement error means that the filter has converged toward the position of the movable magnetic object.

There is also proposed, according to another aspect of the invention, a system for locating at least one movable magnetic object comprising:

a network of at least N tri-axial magnetometers linked together mechanically with no degree of freedom to retain a known relative position of these magnetometers, N being an integer number at least equal to 2;

an electronic processing unit suitable for determining the location of the movable magnetic object or objects on the basis of measurements supplied by the magnetometers of the network and of a location filter;

said electronic processing unit comprising:

means for detecting a magnetometer capable of being magnetized, i.e. capable of delivering as output measurements comprising a measurement bias following a magnetization;

means for correcting, by means of a correction bias, the measurements delivered by said magnetometer capable of being magnetized, said correction bias corresponding to a deviation between the measurements supplied by said magnetometer as input for a location filtering and the estimations, upon said location filtering, of the data delivered by said magnetometer; and means for considering said magnetometer as not capable of being magnetized, by taking into account said step of correction of said magnetometer capable of being magnetized.

BRIEF DESCRIPTION OF THE DRAWINGS

The invention will be better understood on studying a few embodiments described as nonlimiting examples and illustrated by the attached drawings in which.

Throughout the figures, elements having identical references are similar.

DETAILED DESCRIPTION

In the present description, the features and functions well known to those skilled in the art are not described in detail.

Furthermore, in the present description, the biases considered are bias vectors, i.e. they can be mono-axial, bi-axial or tri-axial. In effect, the magnetization can be on one, two or three axes, just like the correction. Also, when describing biases, they are bias vectors which can therefore have one, two or three dimensions, depending on the number of axes affected by the magnetization.

Figure 1:
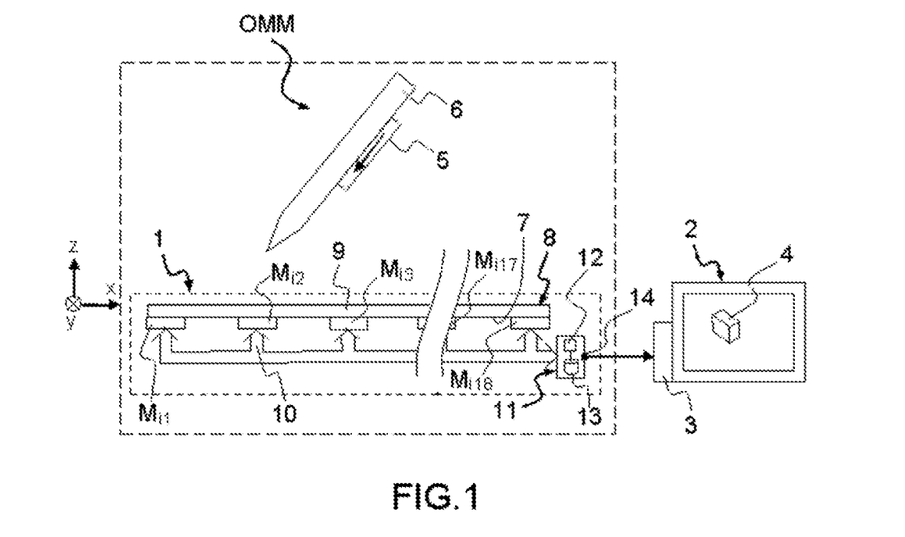
FIGS. 1 and 2 schematically illustrate a location device according to the known prior art.

FIG. 1 represents a device 1 for locating a movable magnetic object OMM according to the prior art, for example described in the document FR 2988862 A1.

The location device 1, in this case, controls an electronic unit 2, for example a screen 2 connected to a control unit 3 capable of controlling the display of an image on this screen 2.

In the example represented, the unit 3 controls the position and the orientation of a cursor 4 on the screen 2. For example, the cursor 4 has a three-dimensional form, such as a rectangular parallelepiped.

A movable magnetic object $OMM_k$ comprises a permanent magnet 5 exhibiting a non-zero magnetic moment even in the absence of external magnetic field and a non-magnetic utensil 6. Non-magnetic is understood to mean a utensil produced in a material exhibiting no measurable magnetic property. For example, the utensil 6 is a pencil, a pen or an eraser made of wood or of plastic. The utensil 6 can be located from the location of the permanent magnet 5. The utensil 6 also makes it possible to facilitate the handling of the permanent magnet 5, particularly when the latter is of small size. Typically, the combination of the permanent magnet 5 and of the utensil 6 can be freely moved directly by the hand of a human being in an orthogonal reference frame XYZ fixed with no degree of freedom to the device 1. In this case, the directions X and Y are horizontal (writing support plane) and the direction Z is vertical. To this end, this combination weighs less than a kilo and, preferably, less than 200 g. The dimensions of this combination are small enough to be able to be grasped and moved by a single hand of a user. The movable magnetic object or objects $OMM_k$ can be freely moved in the orthogonal reference frame XYZ.

For example, the coercive magnetic field of a magnet is greater than 100 A.m$^{-1}$ or 500 A.m$^{-1}$. For example, it is produced in ferro- or ferrimagnetic material. The permanent magnet 5 has an oblong form. In FIG. 1, the direction of the magnetic moment of the permanent magnet 5 is represented by an arrow parallel to the longitudinal direction of this object. As a variant, the permanent magnet 5 can be in the form of a ring surrounding the utensil 6. The greatest length of the permanent magnet 5 is denoted L below.

The strength of the permanent magnet 5 is typically greater than 0.01 A.m$^2$ or 0.1 A.m$^2$. In this embodiment, the permanent magnet 5 is fixed with no degree of freedom to the utensil 6.

The location device 1 makes it possible to locate the permanent magnet 5 in the reference frame XYZ. The location is understood to mean here the determination of the x, y, z position of the permanent magnet 5 in the reference frame XYZ and also the determination of the orientation of the permanent magnet 5 relative to the axes X, Y and Z of the reference frame XYZ. For example, the orientation of the permanent magnet 5 is represented by the angles $\theta_x$, $\theta_y$ and $\theta_z$ of the magnetic moment of the permanent magnet 5, respectively, relative to the axes X, Y and Z of the reference frame.

The location device 1 comprises a network of N tri-axial magnetometers $M_{ij}$. In FIG. 1, the vertical wavy lines indicate that a part of the location device 1 has not been represented.

Typically, N can be greater than five and, preferably, greater than sixteen or thirty-two, even equal to sixty-four.

In this embodiment, the magnetometers $M_{ij}$ are aligned in rows and in columns to form a matrix or network. In this case, this matrix comprises eight rows and eight columns. The indices i and j identify, respectively, the row and the column of this matrix at the intersection of which the magnetometer $M_{ij}$ is located.

In FIG. 1, only the magnetometers $M_{i1}$, $M_{i2}$, $M_{i3}$, $M_{i4}$ and $M_{i8}$ of a row i are visible. The position of the magnetometers $M_{ij}$ relative to one another is described in more detail in FIG. 2.

Each magnetometer $M_{ij}$ is fixed with no degree of freedom to the other magnetometers. To this end, the magnetometers $M_{ij}$ are fixed with no degree of freedom to a rear face 7 of a rigid plate 8. This rigid plate 8 has a front face 9 turned toward the permanent magnet 5. The plate 8 is produced in a rigid non-magnetic material. For example, the plate 8 can be made of glass.

Each magnetometer $M_{ij}$ measures the direction and the intensity of the magnetic field generated by the permanent magnet 5. For that, each magnetometer $M_{ij}$ measures the norm of the orthogonal projection of the magnetic field generated by the permanent magnet 5 at the level of this magnetometer $M_{ij}$ on three measurement axes of this magnetometer. In this case, these three measurement axes are mutually orthogonal. For example, the measurement axes of each of the magnetometers $M_{ij}$ are, respectively, parallel to the X, Y and Z axes of the reference frame.

Each magnetometer $M_{ij}$ is connected via an information transmission bus 10 to a processing unit 11.

The processing unit 11 is capable of determining the position and the orientation of the permanent magnet 5 in the reference frame XYZ from the measurements of the magnetometers $M_{ij}$. To this end, the unit 11 comprises a programmable electronic computer 12 capable of executing instructions stored on an information storage medium. The unit 11 therefore also comprises a memory 13 containing the instructions necessary for the execution by the computer 12 of the method of FIG. 3.

In particular, the unit 11 implements a physico-mathematical model associating each measurement of a magnetometer $M_{ij}$ with parameters representative of the position and of the orientation of the permanent magnet 5, i.e. also of the utensil 6, in the reference frame XYZ.

This model is implemented in the form of a nonlinear estimation filter, for example an extended Kalman filter.

This model is typically constructed from the physical equation of electromagnetism. To construct this model, the permanent magnet 5 is approximated by a magnetic dipole. This approximation introduces very few errors if the distance between the permanent magnet 5 and the magnetometer $M_{ij}$ is greater than 2 L and, preferably, greater than 8 L; L being the greatest dimension of the permanent magnet 5. Typically, L is below 20 cm and, preferably, below 10 or 5 cm The unit 11 is also capable of restoring the measured position and orientation of the permanent magnet 5 on an interface 14.

The control unit 3 is connected to the unit 11 via this interface 14.

Figure 2:
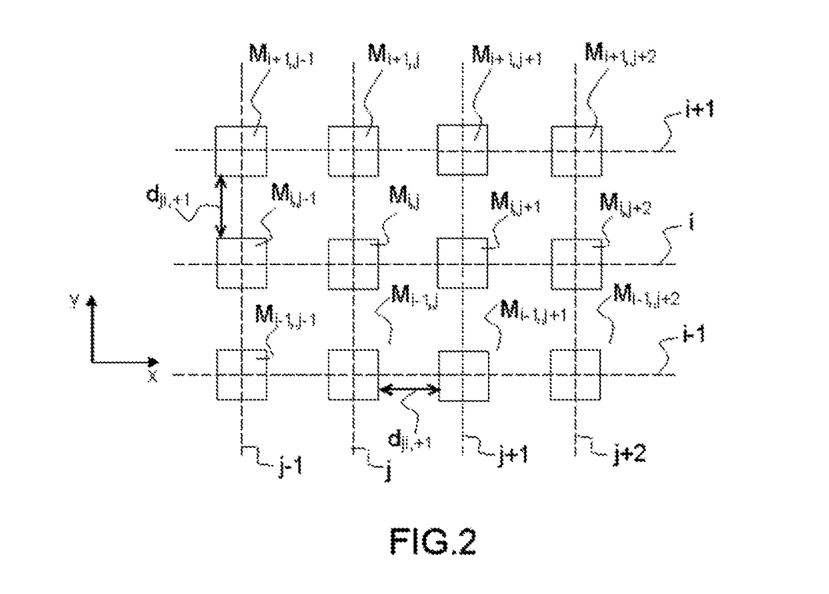

FIG. 2 represents a part of the magnetometers $M_{ij}$ of the location device 1. These magnetometers $M_{ij}$ are aligned in rows i parallel to the direction X. These magnetometers are also aligned in columns j parallel to the direction Y to form a matrix or network. The rows i and the columns j are arranged in ascending index order.

The center of the magnetometer $M_{ij}$ is located at the intersection of the row i and of the column j. The center of the magnetometer corresponds to the point at which the magnetic field is measured by this magnetometer. In this case, the indices i and j lie within the interval [1;8].

The centers of two immediately consecutive magnetometers $M_{ij}$ and $M_{1,j+1}$ along a row i are separated by a known distance $d_{i,j,j+1}$. Similarly, the center of two immediately consecutive magnetometers $M_{ij}$ and $M_{i+1,j}$ along a same column j are separated by a known distance $d_{j,i,i+1}$.

In the particular case now described, whatever the row i, the distance $d_{i,j,j+1}$ is the same. This distance is therefore denoted $d_j$. Similarly, whatever the column j, the distance $d_{j,i,i+1}$ between two magnetometers is the same. This distance is therefore denoted $d_i$. In the example described, the distances $d_i$ and $d_j$ are both equal to d.

Typically, the distance d is between 1 and 4 cm when 1 the strength of the permanent magnet is 0.5 A.m$^2$, the sensitivity of the magnetometers is $4.10^{-7}$ T, and the number of magnetometers $M_{ij}$ is sixty-four.

Figure 3:
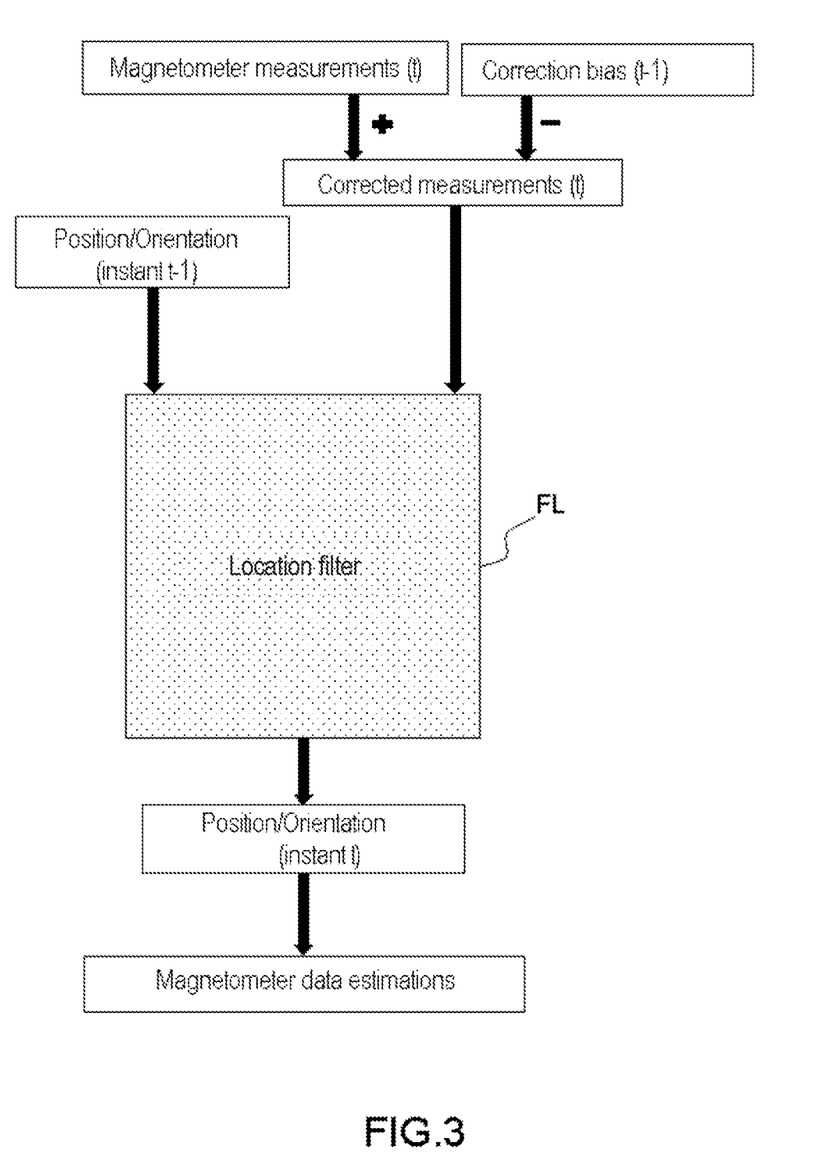
FIGS. 3 and 4 schematically illustrate a The method as claimed in an aspect of the invention.

FIG. 3 schematically illustrates a known method for locating at least one movable magnetic object $OMM_k$ relative to a network of at least N tri-axial magnetometers $M_{i,j}$ linked together mechanically with no degree of freedom to retain a known relative position of these magnetometers.

The measurements performed by the magnetometers $M_{i,j}$ at the current instant t are corrected of a respective offset before the location filtering FL, which also receives as input the location (for example position and orientation) of each movable magnetic object $OMM_k$ of the preceding instant t-1. The location filtering FL delivers as output the location (for example position and orientation) of each movable magnetic object $OMM_k$ at the current instant t, making it possible to compute estimations of the data from the magnetometers $M_{i,j}$.

The respective offsets are then constant over time, which does not make it possible to ensure a correct operation over the period of operation of the magnetometers, because the magnetization phenomenon creates additional biases over time which are not taken into account; only the initial biases are then taken into account.

Figure 4:
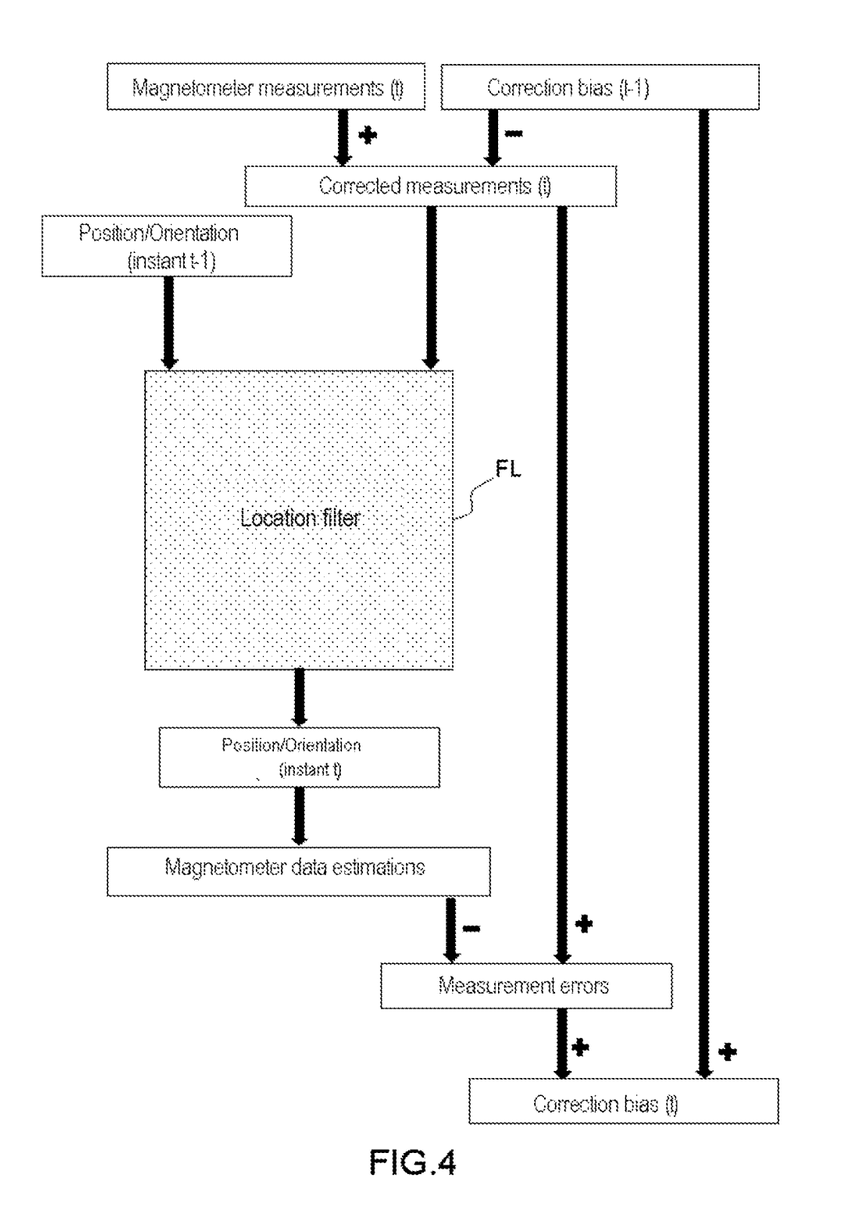

FIG. 4 schematically represents a method for locating at least one movable magnetic object $OMM_k$ relative to a network of at least N tri-axial magnetometers $M_{i,j}$ linked together mechanically with no degree of freedom to retain a known relative position of these magnetometers $M_{i,j}$ according to one aspect of the invention.

The measurements supplied by the magnetometers $M_{i,j}$ at the current instant t are corrected of a respective correction offset, or respective correction bias $BC_{i,j}^{mes}$, computed at the preceding instant t-1, then supplied as input for the location filtering FL together with a location (for example position and orientation) of the movable magnetic object or objects $OMM_k$ at the preceding instant t-1.

The location filtering FL delivers as output a location (for example position and orientation) of the movable magnetic object or objects $OMM_k$ at the current instant t, making it possible to compute estimations of the data supplied by the magnetometers $M_{i,j}$, in turn making it possible to compute, by subtraction from the corrected measurements of the current instant t, a respective measurement error of each magnetometer $M_{i,j}$. These respective measurement errors, added to the corrected measurements of the current instant t, makes it possible to determine the respective correction biases $BC_{i,j}^{mes}$ of the current instant t.

These steps are repeated continuously or iteratively, thus making it possible, on each iteration, to determine the correction biases $BC_{i,j}^{mes}$ of the magnetometers $M_{i,j}$. Thus, the method of the invention for correcting, continuously, possible magnetization of the magnetometers $M_{i,j}$.

The steps of the method are implemented by means of the electronic processing unit 11.

Thus, the method comprises:

a step of detection E1 of a magnetometer $M_{i,j}$ capable of being magnetized, i.e. capable of delivering as output measurements $B_{i,j}^{mes}$ comprising a measurement bias $BM_{i,j}^{mes}$ following a magnetization;

a step of correction E2, by means of a correction bias $BC_{i,j}^{mes}$, of the measurements $B_{i,j}^{mes}$ delivered by said magnetometer $M_{i,j}$ capable of being magnetized, said correction bias $BC_{i,j}^{mes}$ corresponding to a deviation between the measurements $B_{i,j}^{mes}$ supplied by said magnetometer $M_{i,j}$ as input for a location filtering FL and the estimations $B_{i,j}^{est}$, upon said location filtering FL, of the data delivered by said magnetometer $M_{i,j}$; and a step of consideration E3 of said magnetometer $M_{i,j}$ as not capable of being magnetized, by taking into account said step of correction of said magnetometer $M_{i,j}$ capable of being magnetized.

The method can also comprise an influence limiting step E4 consisting in limiting, in said location filtering FL, the influence of the measurements $B_{i,j}^{mes}$ supplied by said magnetometer $M_{i,j}$ capable of being magnetized.

This influence limiting step E4 can comprise an increasing of a variance associated with the measurements $B_{i,j}^{mes}$ of said magnetometer $M_{i,j}$ capable of being magnetized in said location filtering FL using a Kalman filtering, or not taking into account the measurements $B_{i,j}^{mes}$ of said magnetometer $M_{i,j}$ capable of being magnetized in said location filtering FL.

The detection step E1 can use an information of saturation of a status register directly supplied by said magnetometer $M_{i,j}$ capable of being magnetized; and/or detect a magnetometer $M_{i,j}$ capable of being magnetized when a norm of the values of the measurements $B_{i,j}^{mes}$ supplied by said magnetometer $M_{i,j}$ capable of being magnetized are greater than a first threshold S1; and/or detect a magnetometer $M_{i,j}$ capable of being magnetized when a norm of the estimations $B_{i,j}^{est}$, upon said location filtering FL, of the data delivered by said magnetometer $M_{i,j}$ capable of being magnetized, are greater by a second threshold S2 than the norm of the estimations $B_{i,j}^{est}$ of said delivered data computed from the estimations $B_{i,j}^{est}$, upon said location filtering FL, of the data delivered by the other magnetometers $M_{i,j}$ not detected as capable of being magnetized; and/or detect a magnetometer $M_{i,j}$ capable of being magnetized when an error on the measurements $B_{i,j}^{mes}$ of a magnetometer $M_{i,j}$ is greater by a third threshold S3 than each of the errors on the measurements $B_{i,j}^{mes}$ of the other magnetometers $M_{i,j}$, an error on the measurements $B_{i,j}^{mes}$ of a magnetometer $M_{i,j}$ corresponding to a deviation between the measurements $B_{i,j}^{mes}$ supplied by said magnetometer $M_{i,j}$ as input for a location filtering FL and the estimations $B_{i,j}^{est}$, upon said location filtering FL, of the data delivered by said magnetometer $M_{i,j}$.

As a variant of this last condition, the detection step E1 can detect a magnetometer $M_{i,j}$ capable of being magnetized when a norm of an error on the measurements $B_{i,j}^{mes}$ of a magnetometer $M_{i,j}$ is greater than a third threshold S3bis.

The correction step E2 can be performed when said magnetometer $M_{i,j}$ capable of being magnetized is not saturated; and/or when the measurements $B_{i,j}^{mes}$ delivered by said magnetometer $M_{i,j}$ capable of being magnetized are below a fourth threshold S4; and/or when the estimations of the data $B_{i,j}^{mes}$ delivered by said magnetometer $M_{i,j}$ capable of being magnetized are below the fourth threshold S4; and/or when the distance separating said magnetometer $M_{i,j}$ capable of being magnetized and the movable magnetic object or objects $OMM_k$ is greater than a fifth threshold S5; and/or when the movable magnetic object or objects $OMM_k$ are in a stable position; and/or when a variance of an estimated position of the movable magnetic object or objects $OMM_k$, over a plurality of successive estimations, is below a sixth threshold S6; and/or when a variance of an error on the measurements $B_{i,j}^{mes}$ of the magnetometers $M_{i,j}$ not detected as capable of being magnetized, over a plurality of successive estimations, is below a seventh threshold S7.

The steps of the method described above can be performed by one or more programmable processors running a computer program to execute the functions of the invention by operating on input data and generating output data.

A computer program can be written in any form of programming language, including compiled or interpreted languages, and the computer program can be deployed in any form, including as stand-alone program or as a subprogram, element or other unit appropriate for use in a computing environment. A computer program can be deployed to be run on one computer or on several computers at a single site or distributed over several sites and linked together by a communication network.

The preferred embodiment of the present invention has been described. Various modifications can be made without departing from the spirit of the scope of the invention. Consequently, other implementations are within the scope of the following claims.

The invention claimed is:

1. A method for locating at least one movable magnetic object in relation to a network of at least N tri-axial magnetometers linked together mechanically with no degree of freedom to retain a known relative position of these magnetometers, N being an integer at least equal to 2, comprises, continuously:
   detecting that a magnetometer is capable of being magnetized such that the magnetometer delivers measurements comprising a measurement bias following a magnetization;
   correcting, by means of a correction bias, the measurements, said correction bias corresponding to a deviation between the measurements supplied by said magnetometer as input for a location filtering and estimations, upon said location filtering, of the measurements delivered by said magnetometer; and
   detecting that said magnetometer is not capable of being magnetized based on said corrections.

2. The method as claimed in claim 1, further comprising:
   limiting, in said location filtering, an influence of the measurements delivered by said magnetometer capable of being magnetized.

3. The method as claimed in claim 2, wherein the influence limiting comprises an increasing of a variance associated with the measurements of said magnetometer capable of being magnetized in said location filtering using a Kalman filtering.

4. The method as claimed in claim 2, wherein the influence limiting comprises not taking into account the measurements of said magnetometer capable of being magnetized in said location filtering.

5. The method as claimed in claim 1, in which the detection step uses information on saturation of a register of status information directly supplied by said magnetometer capable of being magnetized.

6. The method as claimed in claim 1, in which the detection step detects a magnetometer capable of being magnetized when a norm of the values of the measurements supplied by said magnetometer capable of being magnetized are greater than a first threshold.

7. The method as claimed in claim 1, in which the detection step detects a magnetometer capable of being magnetized when a norm of the estimations, upon said location filtering, of the data delivered by said magnetometer ($M_{i,j}$) capable of being magnetized, are greater by a second threshold than the norm of the estimations of said delivered data computed from the estimations, upon said location filtering, of the data delivered by the other magnetometers not detected as capable of being magnetized.

8. The method as claimed in claim 1, in which the detection step detects a magnetometer capable of being magnetized when a norm of an error on the measurements of a magnetometer is greater by a third threshold than each of the errors on the measurements of the other magnetometers, an error on the measurements of a magnetometer corresponding to a deviation between the measurements supplied by said magnetometer as input for a location filtering and the estimations, upon said location filtering, of the data delivered by said magnetometer.

9. The method as claimed in claim 1, in which the detection step detects a magnetometer capable of being magnetized when a norm of an error on the measurements of a magnetometer is greater than a third threshold.

10. The method as claimed in claim 1, in which the correction step is performed when said magnetometer capable of being magnetized is not saturated.

11. The method as claimed in claim 10, in which the correction step is performed when the measurements delivered by said magnetometer capable of being magnetized are below a fourth threshold.

12. The method as claimed in claim 10, in which the correction step is performed when the estimations of the data delivered by said magnetometer capable of being magnetized are below a fourth threshold.

13. The method as claimed in claim 10, in which the correction step is performed when the distance separating said magnetometer capable of being magnetized and the movable magnetic object or objects is greater than a fifth threshold.

14. The method as claimed in claim 10, in which the correction step is performed when the movable magnetic object or objects are in a stable position.

15. The method as claimed in claim 14, in which the correction step is performed when a variance of an estimated position of the movable magnetic object or objects, over a plurality of successive estimations, is below a sixth threshold.

16. The method as claimed in claim 14, in which the correction step is performed when a variance of an error on the measurements of the magnetometers not detected as capable of being magnetized, over a plurality of successive estimations, is below a seventh threshold.

17. A system for locating at least one movable magnetic object comprising:
a network of at least N tri-axial magnetometers linked together mechanically with no degree of freedom to retain a known relative position of these magnetometers, N being an integer number at least equal to 2;
an electronic processing unit suitable for determining the location of the movable magnetic object or objects on the basis of measurements supplied by the magnetometers of the network and of a location filter;
said electronic processing unit comprising:
means for detecting a magnetometer capable of being magnetized, i.e. capable of delivering as output measurements comprising a measurement bias following a magnetization;
means for correcting, by means of a correction bias, the measurements delivered by said magnetometer capable of being magnetized, said correction bias corresponding to a deviation between the measurements supplied by said magnetometer as input for location filtering and the estimations, upon said location filtering, of the data delivered by said magnetometer; and
means for considering said magnetometer as not capable of being magnetized, by taking into account said step of correction of said magnetometer capable of being magnetized.

* * * * *